(No Model.) 2 Sheets—Sheet 1.

G. LAKE.
CUTTER BAR ADJUSTER.

No. 457,051. Patented Aug. 4, 1891.

Witnesses
M. Fowler
N. L. Collamer

Inventor
George Lake
By his Attorneys,
C. A. Snow & Co.

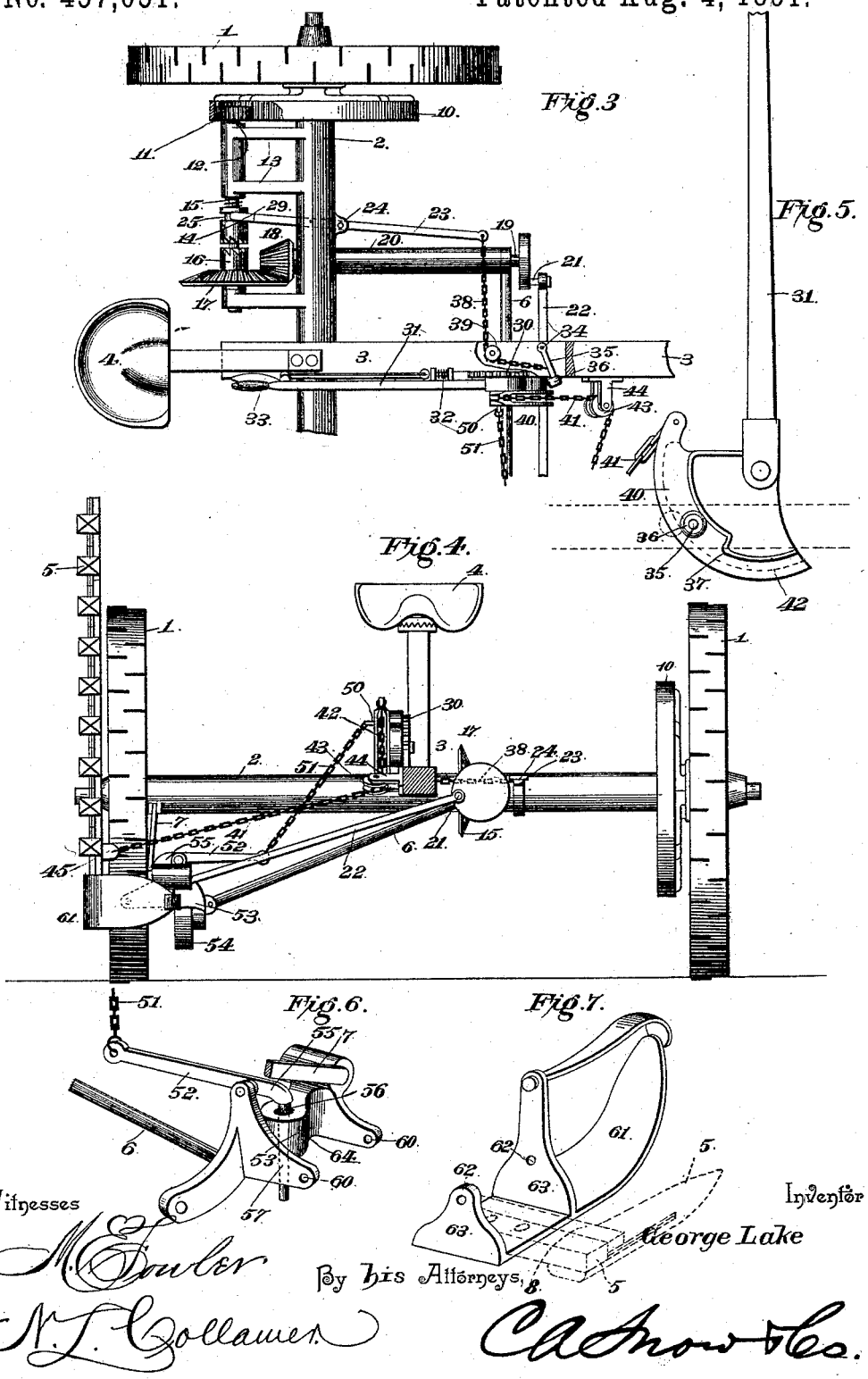

UNITED STATES PATENT OFFICE.

GEORGE LAKE, OF SHERMAN, MICHIGAN.

CUTTER-BAR ADJUSTER.

SPECIFICATION forming part of Letters Patent No. 457,051, dated August 4, 1891.

Application filed September 22, 1890. Serial No. 365,840. (No model.)

*To all whom it may concern:*

Be it known that I, GEORGE LAKE, a citizen of the United States, residing at Sherman, in the county of Wexford and State of Michigan, have invented a new and useful Cutter-Bar Adjuster, of which the following is a specification.

This invention relates to harvesters; and the object of the same is to provide means for raising and lowering the cutting apparatus and simultaneously throwing it out of or into connection with the driving mechanism.

The following specification describes and the accompanying drawings illustrate my preferred method of carrying out this idea, only so much of the harvester being shown as is necessary to give a clear understanding of the co-operating parts in this connection.

Figure 1:
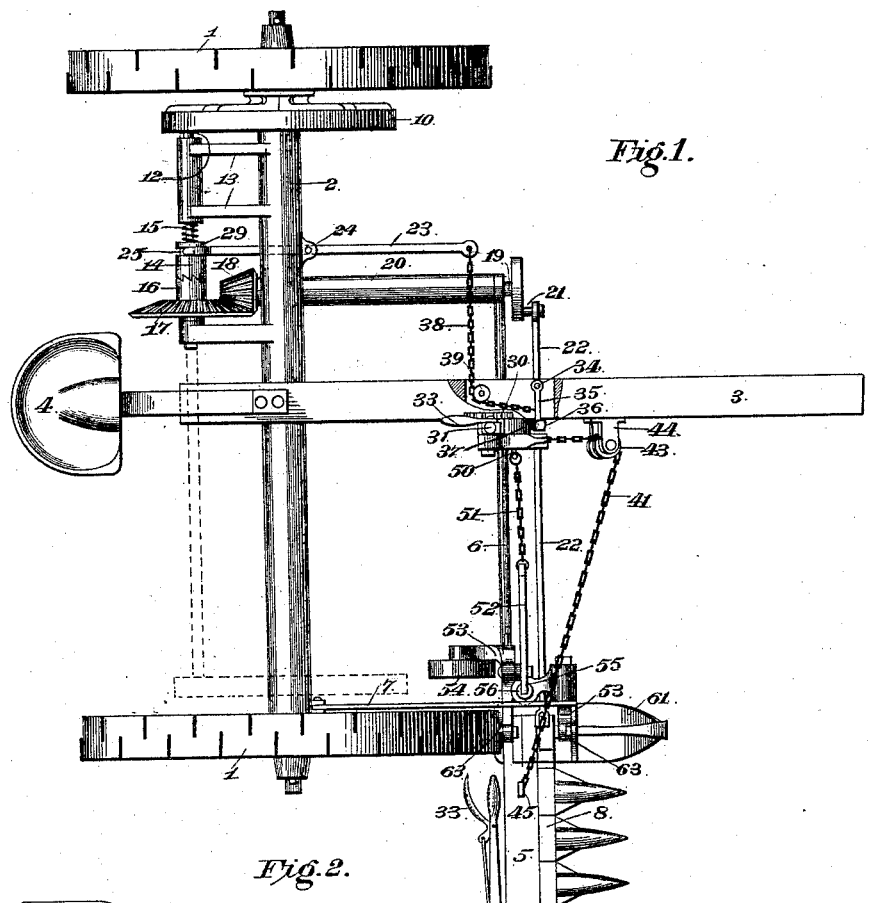
Figure 2:
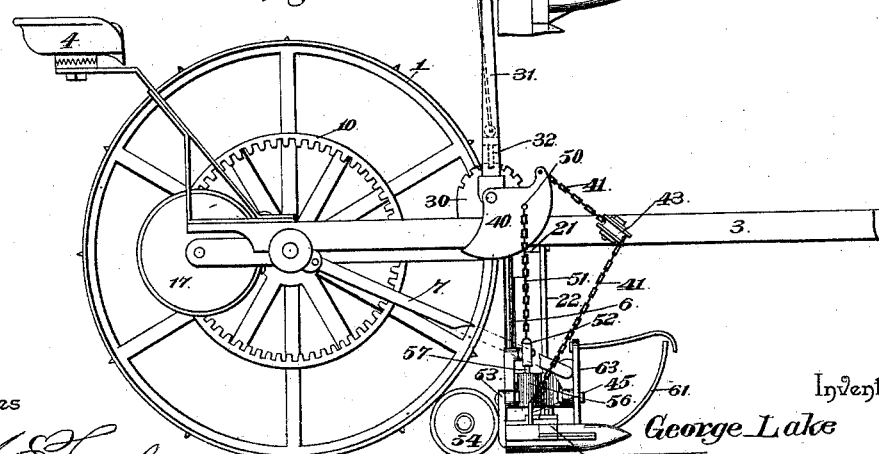

In the said drawings, Figure 1 is a plan, and Fig. 2 is a right side elevation, of a harvester with the cutting apparatus in its operative position. Fig. 3 is a plan, and Fig. 4 a front elevation, of a harvester with the cutting apparatus in its raised or inoperative position. Fig. 5 is an elevation of the left side of the lifting-lever. Fig. 6 is an enlarged perspective detail of the gag-lever and connected devices for raising the inner end of the cutting apparatus. Fig. 7 is a similar detail of the shoe.

Referring to the said drawings, 1 are the wheels, 2 the axle, 3 the tongue, 4 the seat, 5 the finger-bar, 6 and 7 the transverse and longitudinal braces, respectively, and 8 the cutter-bar or knife-bar, of a harvester, all of which are of the usual or of any preferred construction and form no part of the present invention, except as they are used in connection with other devices hereinafter described.

Upon one (or both, see dotted lines, Fig. 1) of the driving-wheels 1 is a toothed ring 10, meshing with a gear 11, which is keyed to a shaft 12 mounted in bearings 13, extending rearwardly from the main axle. Connected by spine and groove with this shaft is a clutch 14, pressed normally inward by a spring 15 into engagement with the clutch-face 16 of a gear 17, which is mounted loosely on the shaft 12. The gear 17 meshes with another 18, mounted on a cranked shaft 19, journaled in a tubular bearing 20, carried by the frame of the machine, and the crank 21 at the front end of this shaft is connected by a pitman 22 with the knife-bar 8 in a manner which will be obvious. By this means when the clutches 14 and 16 are in engagement with each other and the machine is moving over the ground a reciprocatory motion will be imparted to the knife-bar, but when the clutch 14 is disengaged from the clutch-face 16 the motion of the knife-bar will cease.

Pivoted in a toothed plate 30, rising from the tongue 3, is the usual lifting-lever 31, having a locking-pin 32, moved by a supplemental handle 33 into or out of engagement with the teeth on the plate 30 to hold the lever at any desired position, as is common in levers of this character. Mounted on a pin 34 in the tongue 3, adjacent to the lifting-lever 31, is a short arm 35, having a roller 36 at its free end, which roller is engaged by a cam-face 37 on the left side of the base of the lifting-lever. From the arm 35 extends a chain 38, which passes over a wheel 39, mounted in a slot in the tongue, and connects with the front end of a shifting-lever 23, pivoted at 24 to the axle, as shown in Figs. 1 and 3.

The rear end of the shifting-lever 23 is forked, as at 29, and loosely engages a groove 25 in the clutch 14. By this means, when the lifting-lever 31 is turned from the upright position shown in Figs. 1 and 5, its cam-face 37 engages the roller 36, and when said lifting-lever reaches the position shown in Fig. 3 the cam-face 37 has moved the arm 35 forward to the position there shown and disengaged the clutches 14 and 16, thereby stopping the movement of the knife-bar, and at the same time and by the same motion of lever 31 the knife-bar 8 and finger-bar 5 are thrown or drawn to a perpendicular position, as hereinafter explained.

The base of the lifting-lever 31 is segmental in form, as seen at 40, and connected to one end of the segment is a chain 41, traveling in a groove 42 in the edge of the segment, passing over a grooved wheel 43, mounted in a bracket 44, connected to the tongue 3, and leading thence outwardly to an eye 45 in the upper side of the finger-bar 5 outside of its pivot. By this means, when the lifting-lever 31 is turned down to the rear, the chain 41 is drawn upon and the cutting apparatus turned upon its pivot from the position shown in Fig. 1 to that shown in Fig. 4 at the same time that the clutches 14 and 16 are disengaged. A pin 50 is mounted in the right side of the segmental base 40 of the lifting-lever, and from this pin a chain 51 leads downwardly to the inner end of a stout gag-lever 52, (see Fig. 6,) which is pivoted in a bracket 53, carrying the usual wheel 54, which normally travels upon the ground. Beneath the end of the shorter outer arm 55 an eye 56 is formed in the bracket 53, through which eye passes a pin 57, whose lower end rests normally upon the inner end of the finger-bar and whose upper end abuts against said outer arm 55 of the gag-lever 52. By this means the following result is attained: As the lifting-lever 31 is thrown to the rear, the machine being in operation and the knife-bar reciprocating, the upward movement of the pin 50 draws upon the chain 51, raises the inner end of the gag-lever 52, and pushes the pin 57 down against the inner end of the finger-bar 5 inside of its pivots, thus drawing the outer end of finger-bar 55 to a certain inclined position. Then the outer end 55 of gag-lever 52 strikes the upper end of eye 56, formed in bracket 53, and thus the gag-lever 52, bracket 53, and finger-bar are bodily lifted from the ground for about ten inches. At this moment the cam-face 37 engages the roller 36 on the arm 35, disengages the clutches 14 and 16, and stops the reciprocatory movement of the knife-bar 8. At this moment, also, the grooved edge 42 of the segment 40, which has taken up all the slack, now draws upon the chain 41 and turns the cutting apparatus about its pivot to a perpendicular position, as shown in Fig. 4.

In the present case the bracket 53 is shown as provided with eyes 60, each of which it is to be understood is to be pivotally connected with eyes 62, formed in upright plates 63, rising from the shoe 61, and between these plates the finger-bar 5 is bolted to the shoe and the knife-bar 8 reciprocates. The pitman 22, which is connected with the knife-bar, passes beneath the bracket 53 at about the point 64 forward of the eye 56, although all these details of construction, together with others throughout the entire machine, may be considerably varied without departing from the essential principles of my invention.

One of the changes which is within the scope of this invention is the location of the lifting-lever 31 at another point than that shown and above described, and other connections between this lever and the clutch 14 could obviously be used without affecting the other parts of the machine.

What is claimed as new is—

1. In a harvester, the combination, with the lifting-lever 31, the knife-bar 8, driven from the supporting-wheels 1, a clutch in the driving mechanism therefor, and connections, substantially as described, between said lever and clutch for operating the latter, of a segment 40 at the base of the lever, a chain 41, connected to one end of said segment and traveling on the edge thereof, the finger-bar 5, pivoted in a bracket 53, to which bar said chain 41 is connected outside of the pivot, and a chain 51, connected at one end to said segment nearer its center than is the edge thereof and its other end to a gag-lever 52, working through said bracket, the whole adapted to operate as set forth.

2. In a harvester, the combination, with the bracket 53, the finger-bar 5, pivoted therein, the knife-bar 8, reciprocating upon said finger-bar, and supports for the bracket, of the lifting-lever 31, having a segment 40 around its pivot, a chain 41, connected to one end of said segment, traveling on the edge thereof, and connected to said finger-bar outside its pivot, a pin 50 in said segment nearer its center than is the edge thereof, and a chain 51, connecting said pin with a gag-lever 52, working through the bracket, substantially as described.

3. In a harvester, the combination, with the bracket 53, having a vertical eye 56, the braces 6 and 7, pivotally connecting said bracket with the main frame-work, the finger-bar 5, pivoted in said bracket, with its inner end extending beneath said eye, the knife-bar 8, a pitman 22, pivoted to said knife-bar and extending beneath said bracket, and means for reciprocating said pitman, of a pin 57, moving vertically in said eye, a gag-lever 52, pivoted in the bracket, with its short arm bearing on said pin, a lifting-lever 31, having a segment 40 around its pivot, a chain 41, connected to one end and traveling on the edge of said segment, with its other end connected to the finger-bar outside the pivot thereof, and a chain 51, connected at one end to said segment at a point nearer its center than is the edge thereof and at its other end to the long arm of said gag-lever 52, the whole operating substantially as described.

4. In a harvester, the combination, with the lifting-lever 31, having a segment 40 around its pivot, with a cam-face 37 thereon, the finger-bar 5, pivoted in a bracket 53, the knife-bar 8, driven by connections between it and both of the supporting-wheels 1, and a clutch for interrupting the motion of said knife-bar, of clutch-operating devices driven by said cam-face, a chain 51, connecting the segment with a gag-lever 52, working through the bracket, and a chain 41, connecting the finger-bar outside its pivot with the segment, the parts being constructed and timed so as to operate substantially as and for the purpose hereinbefore set forth.

In testimony that I claim the foregoing as my own I have hereto affixed my signature in presence of two witnesses.

GEORGE LAKE.

Witnesses:
ELMER CORNELL,
J. W. RANSOM.